US006295643B1

(12) United States Patent
Brown et al.

(10) Patent No.: US 6,295,643 B1
(45) Date of Patent: Sep. 25, 2001

(54) METHOD AND APPARATUS FOR IMPROVING JAVA VIRTUAL MACHINE PERFORMANCE USING PERSISTENT EXECUTION INFORMATION

(75) Inventors: Michael Wayne Brown, Georgetown; Joseph Herbert McIntyre, Austin; Michael Anthony Paolini, Austin; Scott Lee Winters, Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/210,203

(22) Filed: Dec. 10, 1998

(51) Int. Cl.⁷ ............................................ G06F 9/45
(52) U.S. Cl. .................................................. 717/9
(58) Field of Search .................... 717/2, 4, 5, 6, 717/7, 8, 9

(56) References Cited

U.S. PATENT DOCUMENTS

| | | | |
|---|---|---|---|
| 5,784,553 | * | 7/1998 | Kolawa et al. ........................ 714/38 |
| 5,966,702 | * | 10/1999 | Fresko et al. ........................... 707/1 |
| 5,987,256 | * | 11/1999 | Wu et al. ............................. 395/707 |
| 6,003,038 | * | 12/1999 | Chen ................................... 707/103 |
| 6,131,187 | * | 10/2000 | Chow et al. ............................. 717/5 |
| 6,170,083 | * | 1/2001 | Adl-Tabatabai ......................... 717/9 |

OTHER PUBLICATIONS

Steinhorn, "Compiling Java", Embedded Systems Programming, Sep. 1998, pp. 42–56.*
Gaudin, "Cross-platform concerns", Computerworld, Aug. 11, 1997, pp 14.*
Baer, "Embedded-Java TAkes off with X86 Architecture", Electronic Design, May 27, 1997, pp 105–112.*

* cited by examiner

Primary Examiner—Kakali Chaki
(74) Attorney, Agent, or Firm—Duke W. Yee; Jeffrey S. LaBaw

(57) ABSTRACT

A method and apparatus in a data processing system for optimizing execution of an object by a virtual machine. Monitoring is performed to detect execution of the object. Responsive to detecting execution of the object, content relating to the object, is identified. The content in a class file for the object is stored, wherein the content is used to optimize future executions of the object.

33 Claims, 6 Drawing Sheets

METHOD AND APPARATUS FOR IMPROVING JAVA VIRTUAL MACHINE PERFORMANCE USING PERSISTENT EXECUTION INFORMATION

BACKGROUND OF THE INVENTION

1. Technical Field

The present invention relates generally to an improved data processing system, and in particular to a method and apparatus for executing code in a data processing system. Still more particularly, the present invention relates to a method and apparatus for increasing performance in the execution of Java programs.

2. Description of Related Art

Internet, also referred to as an "internetwork", is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). Information is formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining EL communications path to specific information. Each logical block of information accessible to a client, called a "page" or a "Web page", is identified by a URL. The URL provides a universal, consistent method for finding and accessing this information, not necessarily for the user, but mostly for the user's Web "browser". A browser is a program capable of submitting a request for information identified by a URL at the client machine. Retrieval of information on the Web is generally accomplished with an HTML-compatible browser. The Internet also is widely used to transfer applications to users using browsers.

Users exploring the Web discovered that the content supported by HTML document format on the Web was too limited. Users also desired an ability to access applications and programs, but applications were targeted towards specific types of platforms. As a result, not everyone could access applications or programs. This deficiency has been minimized though the introduction and use of programs known as "applets", which may be embedded as objects in HTML documents on the Web. Applets are Java programs that may be transparently downloaded into a browser supporting Java along with HTML pages in which they appear. These Java programs are network and platform independent. Applets run the same way regardless of where they originate or what data processing system onto which they are loaded.

Java™ is an object oriented programming language and environment focusing on defining data as objects and the methods that may be applied to those objects. Java supports only a single inheritance, meaning that each class can inherit from only one other class at any given time. Java also allows for the creation of totally abstract classes known as interfaces, which allow the defining of methods that may be shared with several classes without regard for how other classes are handling the methods. Java provides a mechanism to distribute software and extends the capabilities of a Web browser because programmers can write an applet once and the applet can be run on any Java enabled machine on the Web.

The Java virtual machine (JVM) is a virtual computer component that resides only in memory. The JVM allows Java programs to be executed on different platforms as opposed to only the one platform for which the code was compiled. Java programs are compiled for the JVM. In this manner Java is able to support applications for many types of data processing systems, which may contain a variety of central processing units and operating systems architectures. To enable a Java application to execute on different types of data processing systems, a compiler typically generates an architecture-neutral file format—the compiled code is executable on many processors, given the presence of the Java run time system. The Java compiler generates bytecode instructions that are non-specific to particular computer architectures. A bytecode is a machine independent code generated by the Java compiler and executed by a Java interpreter. A Java interpreter is a module in the JVM that alternatively decodes and executes a bytecode or bytecodes. These bytecode instructions are designed to be easy to interpret on any machine and easily translated on the fly into native machine code.

A development environment, such as the Java Development Kit (JDK) available from gun Microsystems, Inc., may be used to build Java bytecode from Java language source code and libraries. This Java bytecode may be stored as a Java application or applet on a Web Server, where it can be downloaded over a network to a user's machine and executed on a local JVM.

The Java run-time environment is specifically designed to limit the harm that a Javea application can cause to the system that it is running on. This is especially important with the World Wide Web, where Java applets are downloaded and executed automatically when a user visits a Web page that contains Java applets. Normally one would not want to execute random programs; they might contain viruses, or they might even be potentially malicious themselves and not merely carrying unwelcome code unintentionally. Unless the user specifically allows it (by setting the appropriate flags in the user-interface to the JVM), a Java applet cannot read or write to attached storage devices (except perhaps to a specific, restricted area), nor can it read or write to memory locations (except to a specific, restricted area).

Not only are Java applets designed for downloading over the network, standard Java libraries also specifically support client-server computing. The Java language includes provisions for multi-threading and for network communications. Compared to other languages (such as C), it is much easier to write a pair of programs, one executing locally on the user's computer that is handling the user-interaction, and the other executing remotely on a server, which is performing potentially more sophisticated and processor-intensive work.

While the Java language is designed to be platform-independent, and to execute primarily in a secure environment, programmers can extend Java applications through the use of compiled native binary code on the host operating system using C-style calling conventions through the Java Native Interface (JNI). In this fashion, a Java application can have complete access to the host operating system, including reading and writing to attached I/O devices, memory, etc. Because of this, Java programs can accomplish tasks that are not normally allowed via the JVM at the cost of being platform-specific. However, with a well-designed architecture, a Java language programmer can cleanly isolate the platform-independent portion, and present a clean, platform-independent object application programming interface (API) to other Java components while at the same time accomplishing platform-specific tasks.

To improve performance, without requiring the application developer to write performance sensitive code using a platform specific implementation accessed through JNI, a JVM may provide additional facilities including a Just-in-Time compiler (JIT). A JIT compiler creates platform native code in the address space of the Java Virtual Machine at runtime. Since the lifetime of the objects created with the JIT compiler is limited to the lifetime of the application execution within the Java Virtual Machine, and the objects are always created from the platform independent bytecodes, tile use of a JIT compiler does not make the application platform specific.

The JIT compiler operates as an extension of the JVM. When the JVM encounters a method that has not been compiled by the JIT compiler (JITed), it may call the JIT compiler to create the native runtime objects. Subsequent executions of the method will be executed using the JIT compile code. Typically, the JITed code executes many times faster than the interpreted bytecode.

However, the use of a JIT compiler requires time to create the native runtime objects each time the application is executed. Additional memory for the JIT compile program code and its runtime memory consumption is also needed. As a result, the JIT compile process can often consume a significant amount of processing time in the operation of an application. This real time constraint may limit the number, or aggressiveness, of optimizations that the JIT compiler can attempt to generate native runtime objects that deliver optimal performance.

Thus, it would be advantageous to have an improved method and apparatus that allows the JVM, and its associated content producers like a JIT compiler, to be able to store information that could be retrieved in subsequent executions of the application that may be used to improve runtime resource management, reduce the overhead of executing runtime content producers, and store runtime objects for reloading.

SUMMARY OF THE INVENTION

The present invention provides a method and apparatus in a data processing system for improving the performance of an application using a Java Virtual Machine. The invention utilizes modifications to a Java Virtual Machine, and its related content producers such as just in time compilers. These modifications include the use of monitors to track the internal state and operation of the JVM and content producers, and the addition of a writer operation to record information gathered from the JVM and monitors. The information is stored in a modified Java class file for access by the JVM and content producers in later executions that include the class file.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
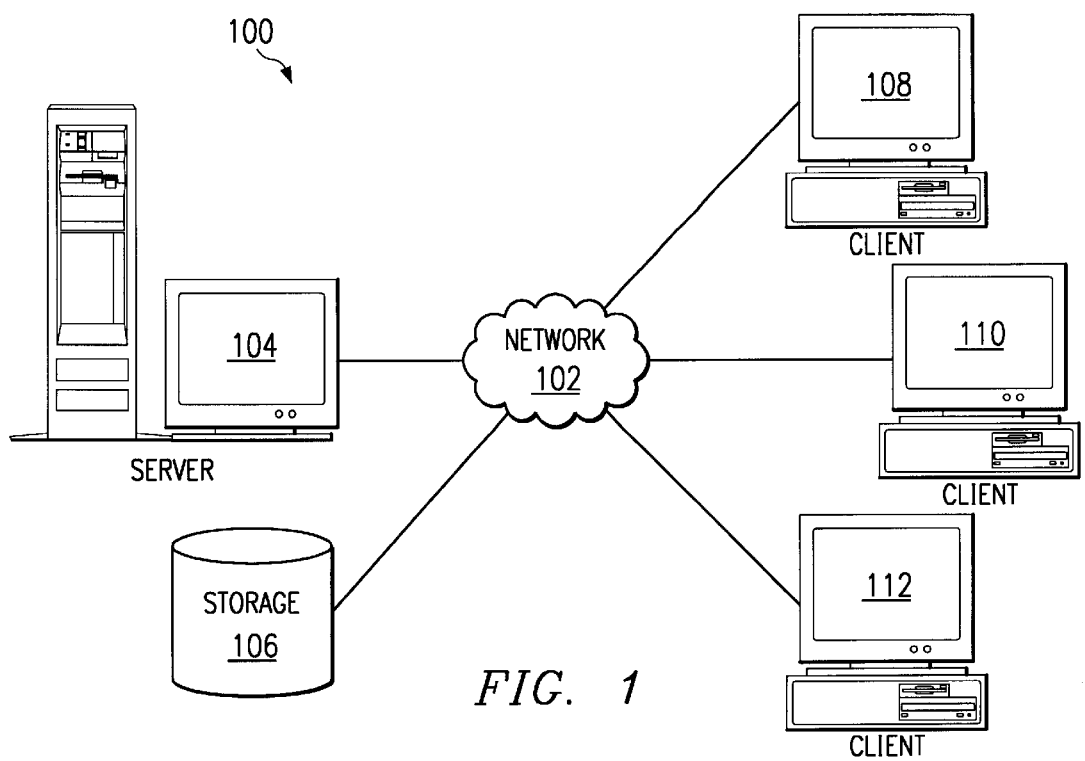
FIG. 1 depicts a pictorial representation of a distributed data processing system in which the present invention may be implemented.

With reference now to the figures, FIG. 1 depicts a pictorial representation of a distributed data processing system in which the present invention may be implemented.

Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, server 104 is connected to network 102 along with storage unit 106. In addition, clients 108, 110, and 112 also are connected to network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems that route data and messages. Of course, distributed data processing system 100 also may be implemented as a number of different types of networks, such as for example, an intranet, a local area network (LAN), or a wide area network (WAN).

FIG. 1 is intended as an example, and not as an architectural limitation for the processes of the present invention.

Figure 2:
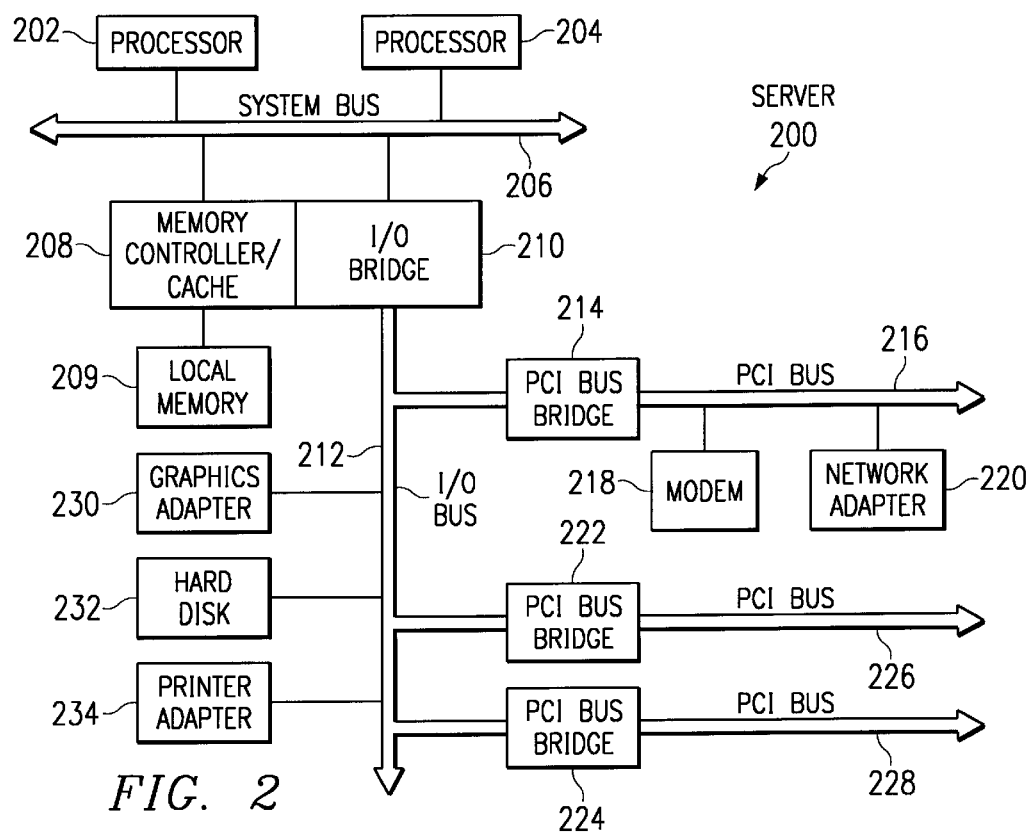
FIG. 2 is a block diagram depicting a data processing system, which may be implemented as a server, in accordance with the present invention.

Referring to FIG. 2, a block diagram depicting a data processing system, which may be implemented as a server, such as server 104 in FIG. 1, in accordance with the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect: (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory-mapped graphics adapter 230 and hard disk 232 may also be connected to I/O bus 212, as depicted, either directly or indirectly.

Those of ordinary skill in the art will appreciate that the hardware depicted in FIG. 2 may vary. For example, other peripheral devices, such as optical disk drive and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, New York, running the Advanced Interactive Executive (AIX) operating system.

Figure 3:
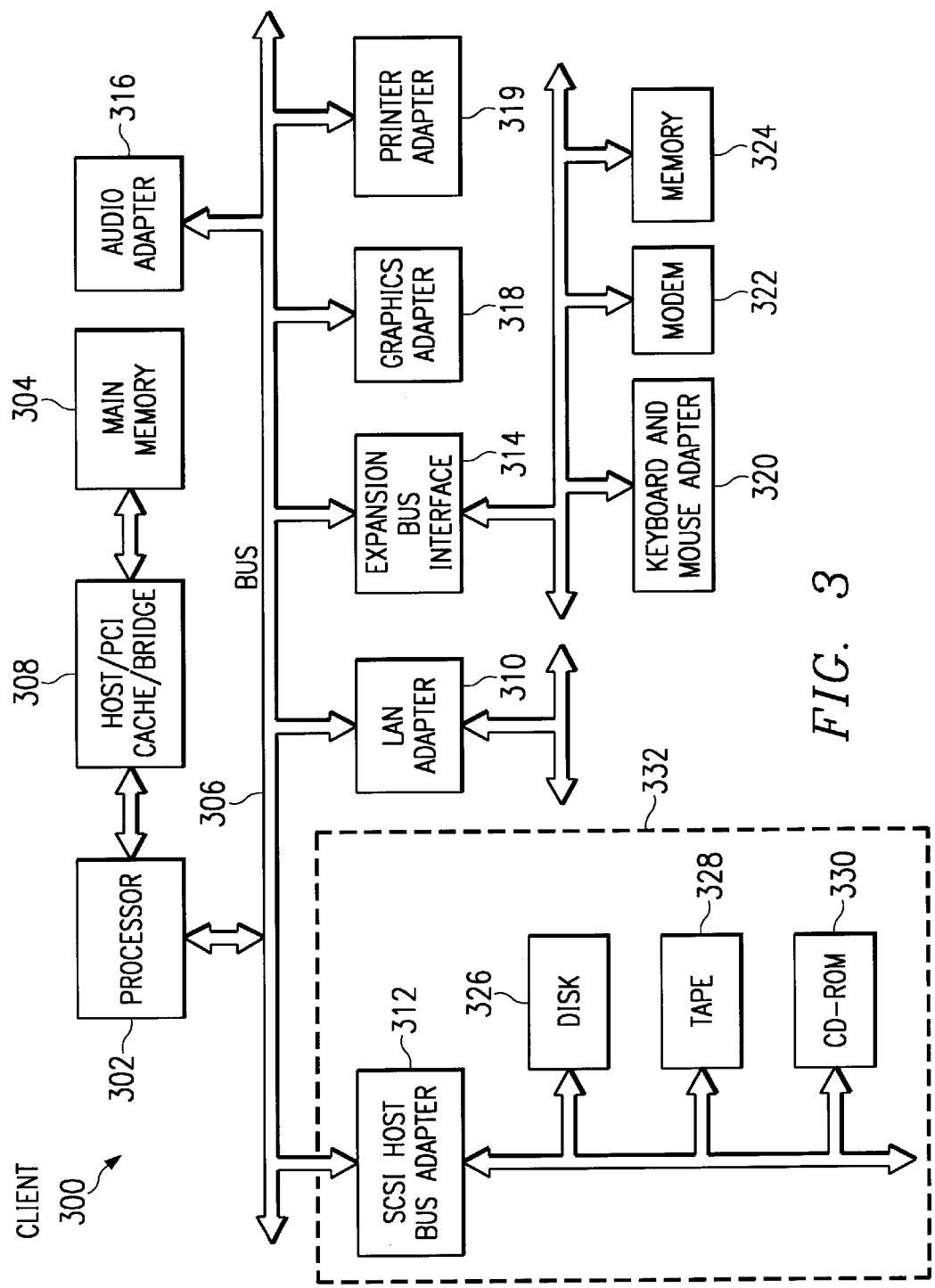
FIG. 3 is a block diagram illustrating a data processing system in which the present: invention may be implemented.

With reference now to FIG. 3, a block diagram illustrating a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Micro Channel arid Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, Small Computer System Interface (SCSI) host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330 in the depicted example. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system such as Java™ may run in conjunction with the operating system and provides calls to the operating system from Java™ programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by the box with the dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide non-volatile memory for storing operating system files and/or user-generated data.

The depicted example in FIG. 3 and above-described examples are not meant to imply architectural limitations with respect to the present invention.

Although FIGS. 1–3 provide examples of configurations of computer systems on which the present invention may execute, the following background information may provide a context for understanding the overall computing environment in which the present invention may be used.

The present invention provides a method, apparatus, and instructions for storing and restoring state information, runtime objects, and native code for Java objects. The present invention provides savings of processing resources used each time the JVM, and any associated content producers, are executed when a Java program executes.

The JVM, and associated content producers such as a JIT compiler, may store content, or state information generated during the execution of an application, and load this content in a subsequent execution of the application. The processes of the present invention create the content that is stored through a number of mechanisms including having the JVM take a snapshot of its current state, the use of execution monitors, and cooperating content producers. The content is written to a persistent data store, with the preferred embodiment using a Fully Caffeinated Class File (FCCF), which is an extended Java class file that allows optimized content to be stored and catalogued.

During a subsequent execution, a JVM loading the stored content will benefit from the information stored. In addition, the information stored could be used by a JVM with the ability to load the content, even if it does not have the capability to generate the content. An example of this usage is the use of a JVM with a JIT compiler for producing optimized content and storing it for subsequent loading by a JVM that has the ability to load the optimized content but does not include a JIT compiler.

Figure 4:
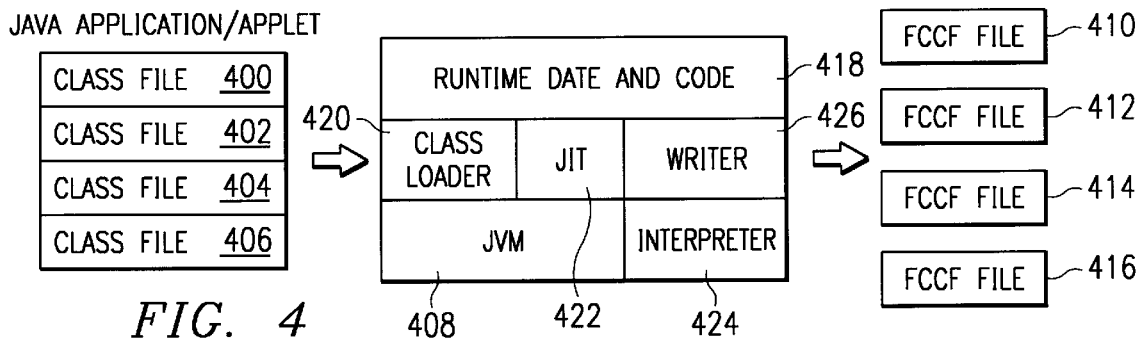
FIG. 4 is an illustration of the collection and storing of content, such as state information, in accordance with a preferred embodiment of the present invention.

With reference now to FIG. 4, ean illustration of the collection and storing of content, such as state information is depicted in accordance with a preferred embodiment of the present invention. In the depicted example, a Java application, or applet, uses a number of class files 400–406, which are processed by JVM 408 to create output class files, which are in the form of fully caffeinated class files (FCCFs) containing the optimized content for increasing performance in feature executions of the Java application, or applet, using class files 400–406. In the depicted example, FCCF files 410–416 correspond to class files 400–406, respectively. JVM 408 contains runtime data and code 418.

The bytecodes from class files 400–406 are loaded into memory by class loader 420 when the JVM starts execution by invoking a method of a specified class from class files 400–406. The loading process is performed by class loader 420, which includes a ClassLoader class, which contains methods for loading new classes into the Java runtime environment. JVM 408 also includes a just in time (JIT) compiler 422 and an interpreter 424. JIT compiler 422 provides a function for compiling methods into native instructions prior to execution. Methods that are to be executed interpretively, are processed by interpreter 424. Writer 426 includes a writer function used to write out the necessary data to generate FCCF files 410–416. This writer function iEs introduced as a modification to the JVM. JIT compiler 422 contains runtime code objects while writer 426 collects the information from the runtime state and stores it out to FCCF files 410–416 with the appropriate platform information.

Figure 5:
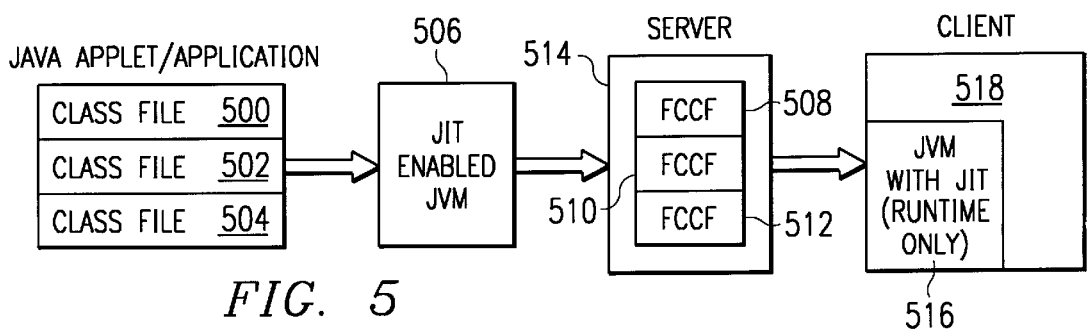
FIG. 5 is a diagram illustrating a scenario in which a JVM with a JIT compiler is used to create FCCF files and to store them on a server for use by another JVM.

With reference now to FIG. 5, a diagram illustrating a scenario in which a JVM with a JIT compiler is used to create FCCF files and to store them on a server for use by another JVM. In this example, class files 500–504 are processed during the execution of a Java applet or application by JVM 506. Information is collected from the execution of these class files to create FCCFs 508–512. These class files are stored on server 514. These class files may then be sent to JVM 516 on client 518. In this example, JVM 516 includes a capability to run code already JITed but not actually produce JITed code. JVM 506 may be located on server 514, or on another computer.

Figure 6:
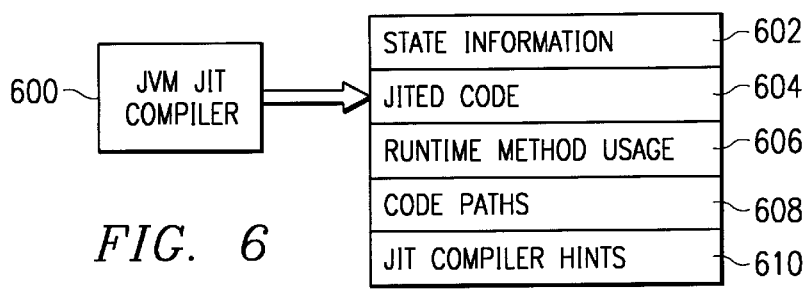
FIG. 6 is an illustration of the types of content that may be collected and stored for optimizing execution of a Java application or applet in accordance with a preferred embodiment of the present invention.

With reference now to FIG. 6, an illustration of the types of content that may be collected and stored for optimizing execution of a Java application or applet are depicted in accordance with a preferred embodiment of the present invention. In this example, JVM 600 also may include a JIT compiler. JVM 600 may collect and store information with respect to methods executed by JVM 600. Information that may be collected for use in creating FCCF files include state information 602. This state information contains information about the state of a JVM and/or JIT compiler. State information may include, for example, runtime memory usage, frequently used classes, garbage collector statistics, and other metrics that would influence how the JVM would use its resources if it knew how the resources were likely to be used. The content collected also may include JITed code 604. Information related to the execution of the code include runtime method usage 606 and code paths 608, which contain information about how the code was executed. JIT compiler hints 610 contains information on optimizations employed by a JIT compiler. This information may be used by the JIT compiler to determine cost of optimization techniques and the value of different optimizations.

According to the present invention, class files include FCCFs. These FCCFs contain bytecodes as with normal class files, which allows existing JVMs to use these FCCFs. In addition, the FCCFs include optimized content, such as data, state information, native code, or pointers to optimized content. An enhanced JVM is able to recognize and use optimized content contained within FCCFs.

Figure 7:
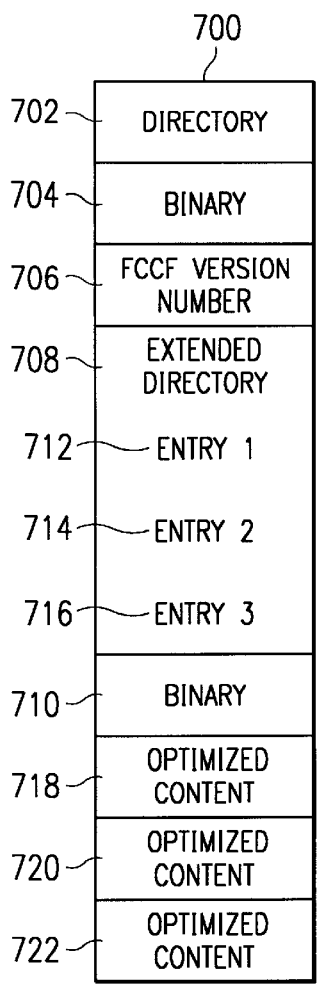
FIG. 7 is a diagram of a fully caffeinated class file (FCCF) and the processing of a FCCF in accordance with a preferred embodiment of the present invention.

With reference now to FIG. 7, a diagram of a fully caffeinated class file (FCCF) and the processing of a FCCF is depicted in accordance with a preferred embodiment of the present invention. FCCF 700 includes a directory 702 and binary 704, which are normally found in a standard Java class file. In addition, a FCCF version number 706, an extended directory 708, and binary 710 are found in FCCF 700.

Directory 702 and binary 704 are standard Java class file entries. Binary 704 is a binary stream of data containing class file data including bytecodes. A JVM that is unable to recognize additional FCCF information will ignore FCCF version number 706, extended directory 708, and binary 710. A standard JVM will be able to read the content within binary 704 using directory 702 and process FCCF 700 as a regular Java class file.

On the other hand, a JVM that is able to process these additional sections will process extended directory 708 to gain entry to binary 710, which is a binary stream of data that contains optimized content. This optimized content may include content as described with reference to FIG. 6 above. In the depicted example, an extended directory 708, also referred to as a table of contents, includes a number of entries.

Extended directory 708 includes entry 1 712, entry 2 714, and entry 3 716. These entries point to optimized content 718, optimized content 720, and optimized content 722, respectively within binary 710.

Figure 8:
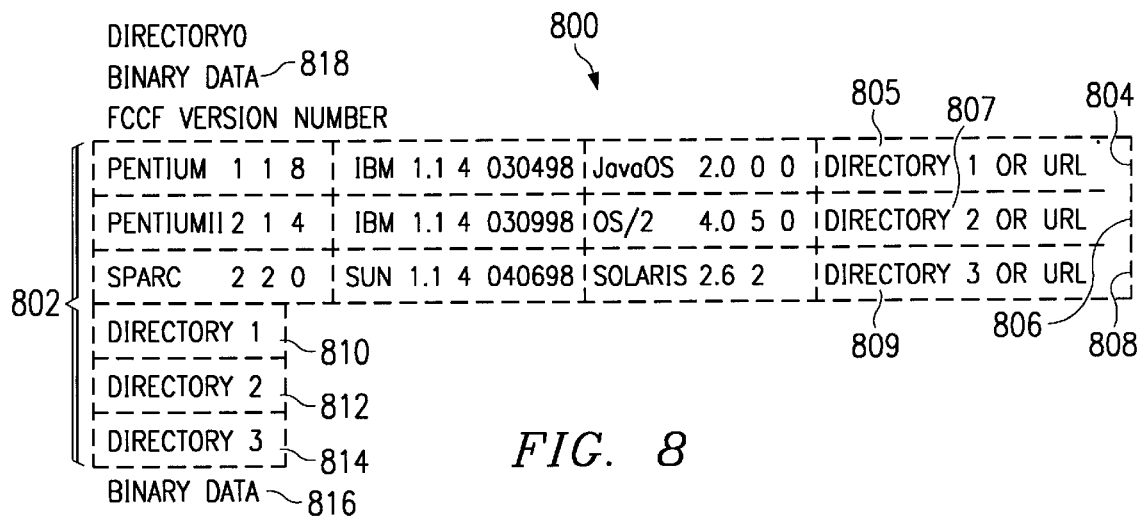
FIG. 8 is an example of a FCCF in accordance with a preferred embodiment of the present invention.

With reference now to FIG. 8, an example of a FCCF is depicted in accordance with a preferred embodiment of the present invention. FCCF 800 illustrates examples of content within an extended directory 802. Platform criteria is found within entries 804, 806, and 808 within extended directory 802. In the depicted FCCF, the criteria used in the entries are the processor type, the JVM, and the operating system. For example, in entry 806, the platform criteria is as follows: Processor PentiumII 2 1 4, JVM IBM 1.1.4 030998, and operating system OS/2 4.0 5 0. Each entry also includes a pointer to a directory or URL associated with the platform criteria. For example, entry 804 includes a pointer to directory 810, entry 806 contains a pointer to directory 812, and entry 808 includes a pointer to directory 814. The relationship of each pointer, 805, 807, and 809, to its directory is a logical relationship. Physical directories 810, 812, and 814, may reside within the FCCF file or may be accessible as an external resource. The directory also could point to byte-codes within binary data 818 in FCCF 800.

More information on FCCFs and their usage may be found in patent applications entitled: Method and Apparatus for Optimizing Execution of Java Programs, Attorney Docket No. AT9-98-225, Ser. No. 09/126,282, filed Jul. 30, 1998, and in Method and. Apparatus for Loading Native Object Code in Data Processing System, Attorney No. AT9-98-224, Ser. No. 09/126,283, filed Jul. 30, 1998, both assigned to the same assignee and both incorporated herein by reference.

Figure 9:
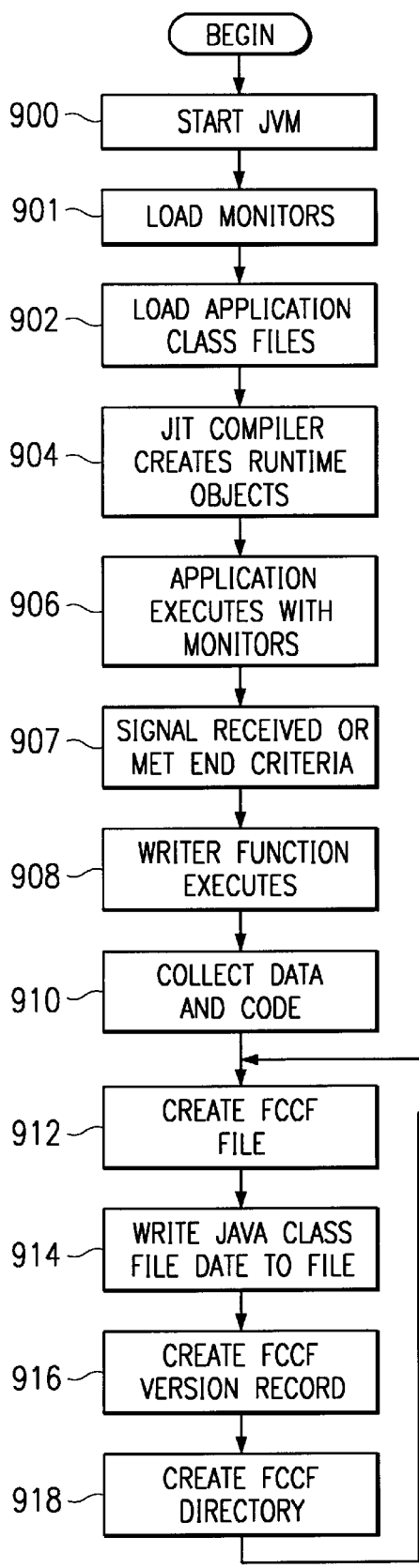
FIG. 9 is a flowchart of a process for obtaining content and creating FCCF files containing the content in accordance with a preferred embodiment of the present invention.

With reference now to FIG. 9, a flowchart of a process for obtaining content and creating FCCF files containing the content is depicted in accordance with a preferred embodiment of the present invention. The process begins by starting the JVM (step 900). Thereafter, any monitors that will be used are loaded and initialized (step 901). Then, the class files, for the application, are loaded (step 902). The JIT compiler creates its runtime objects based on the bytecodes from the class files (step 904). Next, the application is executed (step 906). During execution, monitors collect information. Most monitors are passive, receiving information from the JVM or content producers and updating their information for subsequent retrieval. Active monitors, activated by timers or other notifiers, may retrieve real time information.

Depending on the implementation, two are described, the JVM will transition from application execution to activating the writer function. This step (step 907) may be an external signal or activated by the JVM determining that it has satisfied a set of rules provided to it. When the transition completes, the JVM will activate the writer function (step 908).

In this example, the JVM includes, a writer function to generate output files. When the application execution begins, the execution is monitored, and at some point in execution, the writer function is initiated in step 908. This writer function collects data and/or code from the execution environment (step 910). For each class processed, an FCCF file is then created (step 912). Java class file data is written to the FCCF file (step 914), and a FCCF version is recorded (step 916). Thereafter, an FCCF directory is created (step 918), and the collected content is written into the FCCF file (step 920). A determination is then made as to whether additional classes are present for processing (step 922). If additional classes are present, the process then returns to step 912 as described above. Otherwise, the process terminates.

Figure 10:
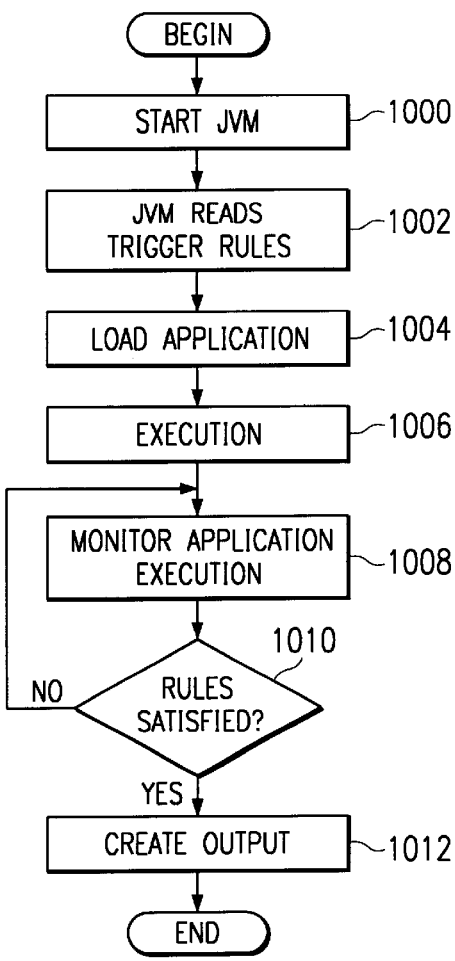
FIG. 10 is a flowchart of a process for activating a writer function according to a set of predefined rules in accordance with a preferred embodiment of the present invention.

Turning now to FIG. 10, a flowchart of a process for activating a writer function is depicted in accordance with a preferred embodiment of the present invention. This writer function used to create the output is a new function added to a JVM. The process begins by starting the JVM (step 1000). The JVM then reads the trigger rules associated for starting the writer function (step 1002). These rules are used so that the trigger is initiated from within the JVM. These rules may be based on time, execution counts, or other criteria that are measurable by the JVM. The JVM then loads the application (step 1004), and the application begins execution (step 1006). The JVM, content producers, and monitors collect data during execution of the application (step 1008). A determination is next made as to whether the rules have been satisfied (step 1010). These trigger rules are checked regularly, which is determined by the type of criteria being checked. If the rules are not satisfied, the process returns to step 1008. Otherwise, output is created (step 1012). This output, in the depicted examples, is in the form of FCCF files by the writer function implemented in the JVM.

Figure 11:
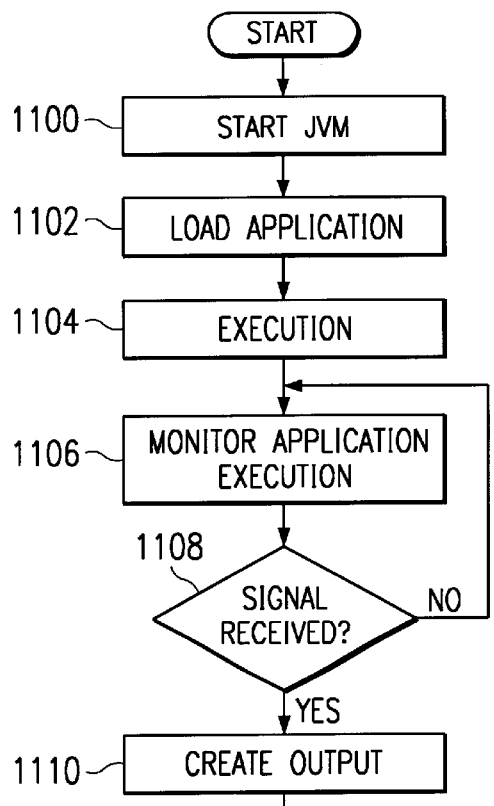
FIG. 11 is a flowchart of a process illustrating the activation of a writer function using an external trigger in accordance with a preferred embodiment of the present invention.

Turning now to FIG. 11, a flowchart of a process illustrating the activation of a writer function using an external trigger is depicted in accordance with a preferred embodiment of the present invention. The process begins by starting the JVM (step 1100). Thereafter, the application is loaded by the class loader (step 1102), and execution of the application begins (step 1104). The JVM, content producers, and monitors collect data during the execution of the application (step 1106). A determination is made as to whether a signal has been received (step 1108). The signal is a trigger that may be implemented in the manner similar to a remote debugger and break instruction. In this situation, the JVM listens on a particular port for the outside signal. This mechanism may be implemented as part of an external monitoring application such as a profiler. While this signal is not received, the process returns to step 1106 for continued execution and monitoring of the application. Upon receiving the appropriate signal, the process then activates the writer function to generate FCCF files as output (step 1110) with the process terminating thereafter.

Figure 12:
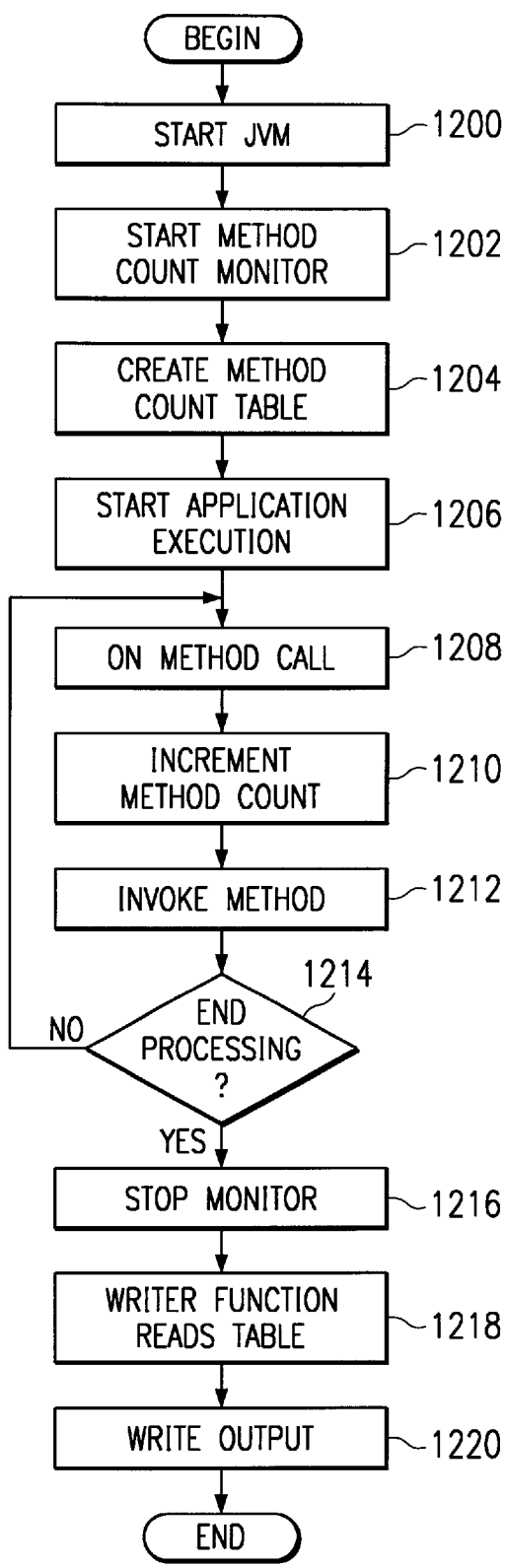
FIG. 12 is a flowchart of a process for obtaining runtime method usage illustrated in accordance with a preferred embodiment of the present invention.

Turning next to FIG. 12, a flowchart of a process for obtaining runtime method usage is illustrated in accordance with a preferred embodiment. of the present invention. In this example, the content collected relates to runtime method usage that identifies method execution rates. Other types of content collection may be implemented in a manner suitable to the type of monitoring done and the output requirements. For example, a JIT compiler may create an optimization table to record the cost and value of a variety of optimization techniques, and may also implement content interfaces for delivering both this information and actual JITed code to the writer function. In this instance, the JVM or JIT compiler provides for locating the cole and related information and for extracting the cole in related information.

The process begins by starting the JVM (step 1200). Thereafter, a method count monitor begins monitoring method execution (step 1202). Also, a method count table is initialized or created (step 1204). Then, the application execution is initiated (step 1206). As the application executes, the JVM will be presented with method calls to invoke. When the invocation processing is being processed (step 1208), the JVM will call the method count monitor to update the count for this method (step 1210). Thereafter, the method is invoked (step 1212). Next, a determination is then made as to whether processing is to end (step 1214). If processing is not complete, the process returns to step 1208 to wait for another method call. Otherwise, the monitoring of the method execution is stopped (step 1216). The writer function reads the method count table (step 1218) and generates an FCCF file using the information read from the method count table (step 1220) with the process terminating thereafter.

With respect to the example described in FIG. 12, recording of method call counts, the JVM provides the monitor for tracking method calls and provides access to the results generated by the monitor. If code paths are identified, recording of the path that an application follows is made. This information may be used to predict the most likely path through an application. In recording this information, the JVM provides a monitor for tracking a providing access to the results generated by the monitor. If JIT compiler hint optimizations are stored or recorded, information provided by the JIT compiler is identified that will be useful in decision making by the JIT compiler in subsequent executions. This information may include, for example, recording the size of the code going into the JIT compiler along with the size of the code coming out. This indicates memory usage without and with JITed code. Optimizations that were used for the method and the amount of time spent compiling the method are other examples of optimization information that may be recorded. In these cases, the JIT compiler records the information and will provide an interface to the writer function to retrieve the information for storage.

Figure 13:
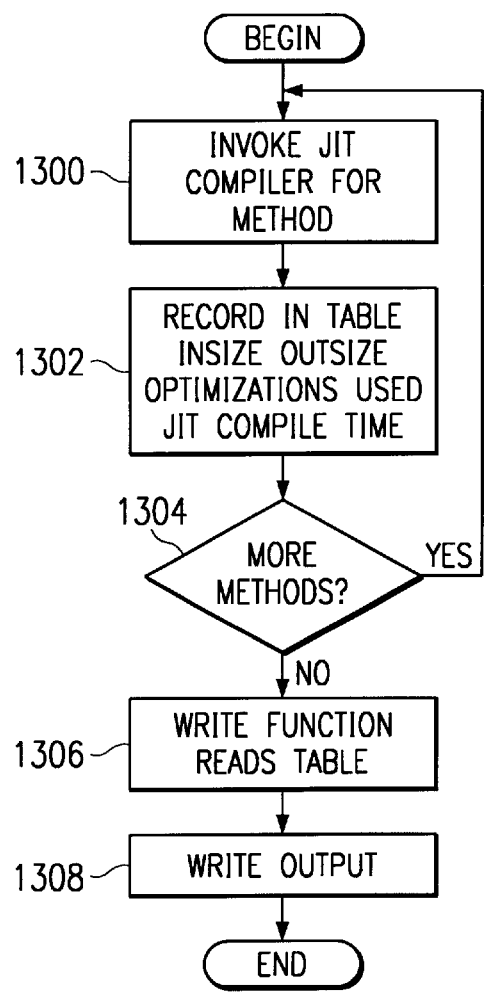
FIG. 13 is a flowchart of a process illustrating identification of JIT compiler hints on optimization in accordance with a preferred embodiment of the present invention.

With reference now to FIG. 13, a flowchart of a process illustrating identification of JIT compiler hints on optimization is depicted in accordance with a preferred embodiment of the present invention. The process begins with the invocation of the JIT compiler for a method (step 1300). Next, information regarding the in-size, out-size, optimizations used, and JIT compile time are recorded in a table (step 1302). Thereafter, a determination is made as to whether more methods are present for processing (step 1304). If more methods are present, the process returns to step 1300. Otherwise, the writer function is activated, which reads the table in which the information was recorded (step 1306). Thereafter, the information read by the writer function is written into an output, such as a FCCF (step 1308) with the process terminating thereafter.

It is important to note that, while the present invention has been described in the context of a fully functioning data processing system, those of ordinary skill in the art will appreciate that the processes of the present invention are capable of being distributed in the form of a computer readable medium of instructions and a variety of forms, and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for optimizing execution of an object by a virtual machine, the method comprising:

detecting execution of the object;

responsive to detecting execution of the object, identifying content relating to the object; and storing the content in a class file for the object, wherein the content is used to optimize future executions of the object.

2. The method of claim 1 further comprising:

sending the class file to another data processing system, wherein the content is used to optimize the execution of the object on the another data processing system.

3. The method of claim 2, wherein the class file is a fully caffeinated class file.

4. The method of claim 1, wherein the content includes state information for the virtual machine.

5. The method of claim 1, wherein the object includes code and wherein the content includes a size of the code prior to execution of the code.

6. The method of claim 5, wherein the code is just in time compiled and wherein the content includes a size of the code after just in time compilation.

7. The method of claim 1 wherein the object includes code that is just in time compiled and wherein the content includes an identification of optimizations used to just in time compile the code.

8. The method of claim 1, wherein the virtual machine is a Java virtual machine.

9. A process in a data processing system for optimizing execution of a method, the method comprising:

detecting execution of the method;

responsive to detecting execution of the method, identifying content generated during execution of the method;

writing class file data to a class file; and writing the content to the class file, wherein the content is used to optimize future executions of the method.

10. The process of claim 9 further comprising:

writing a first directory to the class file, wherein the first directory provides access to the class file data.

11. The process of claim 10, further comprising:

writing a second directory to the class file, wherein the second directory provides access to the content.

12. The process of claim 9, wherein the class file data is a plurality of bytecodes.

13. The process of claim 9, wherein the method is executed by a Java virtual machine having a state during execution of the method and wherein the content includes the state of the Java virtual machine during execution of the method.

14. A class file in a computer readable medium, wherein the class file comprises:

a plurality of bytecodes;

a first directory, wherein the directory points to the plurality of bytecodes; and content, wherein the content includes information of a state of a Java machine executing the plurality of bytecodes.

15. The class file of claim 14, wherein the class file is a fully caffeinated class file.

16. The class file of claim 14, wherein content includes a size of the bytecodes prior to execution of the code.

17. The class file of claim 14, wherein the bytecodes are just in time compiled and wherein the content includes a size of the bytecodes resulting from just in time compiling the bytecodes.

18. The class file of claim 14, wherein the bytecodes are just in time compiled and wherein the content includes an identification of optimizations used to just in time compile the bytecodes.

19. A data processing system for optimizing execution of an object by a virtual machine, the data processing system comprising:

detecting means for detecting execution of the object;

identifying means, responsive to detecting execution of the object, for identifying content relating to the object; and storing means for storing the content in a class file for the object, wherein the content is used to optimize future executions of the object.

20. The data processing system of claim 19 further comprising:

sending means for sending the class file to another data processing system, wherein the content is used to optimize the execution of the object on the another data processing system.

21. The data processing system of claim 20, wherein the class file is a fully caffeinated class file.

22. The data processing system of claim 19, wherein the content includes state information for the virtual machine.

23. The data processing system of claim 19, wherein the object includes code and wherein the content includes a size of the code prior to execution of the code.

24. The data processing system of claim 23, wherein the code is just in time compiled and wherein the content includes a size of the code after just in time compilation.

25. The data processing system of claim 19 wherein the object includes code that is just in time compiled and wherein the content includes an identification of optimizations used to just in time compile the code.

26. The data processing system of claim 19, wherein the virtual machine is a Java virtual machine.

27. A data processing system for optimizing execution of a method, the data processing system comprising:

detecting means for detecting execution of the method;

identifying means, responsive to detecting execution of the method, for identifying content generated during execution of the method;

first writing means for writing class file data to a class file; and second writing means for writing the content to the class file, wherein the content is used to optimize future executions of the method.

28. The data processing system of claim 27 further comprising:

writing means for writing a first directory to the class file, wherein the first directory provides access to the class file data.

29. The data processing system of claim 28, further comprising:

writing means for writing a second directory to the class file, wherein the second directory provides access to the content.

30. The data processing system of claim 27, wherein the class file data is a plurality of bytecodes.

31. The data processing system of claim 27, wherein the method is executed by a Java virtual machine having a state during execution of the method and wherein the content includes the state of the Java virtual machine during execution of the method.

32. A computer program product in a computer readable medium for optimizing execution of an object by a virtual machine, the computer program product comprising:

first instructions for detecting execution of the object;

second instructions for responsive to detecting execution of the object, identifying content relating to the object; and third instructions for storing the content in a class file, for the object, wherein the content is used to optimize future executions of the object.

33. A computer program product in a computer readable medium for optimizing execution of a method, the computer program product comprising:

first instructions for detecting execution of the method;

second instructions for responsive to detecting execution of the method, identifying content generated during execution of the method;

third instructions for writing class file data to a class file; and fourth instructions for writing the content to the class file, wherein the content is used to optimize future executions of the method.

* * * * *

UNITED STATES PATENT AND TRADEMARK OFFICE
CERTIFICATE OF CORRECTION

PATENT NO. : 6,295,643 B1
DATED : September 25, 2001
INVENTOR(S) : Brown et al.

Page 1 of 1

It is certified that error appears in the above-identified patent and that said Letters Patent is hereby corrected as shown below:

Title page,
ABSTRACT, line 5, delete comma after "to the object";

Column 5,
Line 51, after "interconnect", delete colon;

Column 7,
Line 51, after "Fig. 4, delete "ean" and insert -- an --;

Column 9,
Line 14, referring to "entry 1", the 1 should not be bold;
Line 14, referring to "entry 2", the 2 should not be bold;
Line 10, referring to "entry 3", the 3 should not be bold;

Column 10,
Line 1, after "includes", delete comma;

Column 13,
Line 34, after "file", delete comma.

Signed and Sealed this

Second Day of April, 2002

*Attest:*

JAMES E. ROGAN
*Attesting Officer*     *Director of the United States Patent and Trademark Office*